United States Patent [19]

Fricko et al.

[11] 4,179,859

[45] Dec. 25, 1979

[54] MOLDING RETAINING CLIP

[75] Inventors: John J. Fricko, Harper Woods; George M. Newton, Sterling Heights, both of Mich.

[73] Assignee: General Motors Corporation, Detroit, Mich.

[21] Appl. No.: 932,000

[22] Filed: Aug. 8, 1978

[51] Int. Cl.² ............................................. E04F 19/02
[52] U.S. Cl. ..................................... 52/397; 52/403; 52/773; 52/718
[58] Field of Search ................ 52/397, 403, 718, 716, 52/769, 773, 774, 208, 401, 393

[56] References Cited

U.S. PATENT DOCUMENTS

| | | | |
|---|---|---|---|
| 2,133,837 | 10/1938 | Wiley | 52/718 |
| 2,148,847 | 2/1939 | Wiley | 52/718 |
| 3,004,643 | 10/1961 | MacCallum | 52/718 |
| 3,381,434 | 5/1968 | Carson | 52/397 |
| 3,388,517 | 6/1968 | Wohl et al. | 52/403 |
| 3,413,770 | 12/1968 | Adams | 52/208 |
| 3,611,663 | 10/1971 | Andrey | 52/397 |
| 3,634,991 | 1/1972 | Barton et al. | 52/718 |
| 3,738,074 | 6/1973 | Tucker | 52/718 |
| 3,740,800 | 6/1973 | Meyer | 52/718 |
| 3,968,613 | 7/1976 | Meyer | 52/718 |
| 3,981,697 | 9/1976 | Buckthorpe | 52/208 |

*Primary Examiner*—James L. Ridgill, Jr.
*Attorney, Agent, or Firm*—R. L. Phillips

[57] ABSTRACT

A molding retaining clip for securing molding, such as a rear window reveal molding, to an imperforate body flange of a vehicle body, the clip comprising a waved strip of resilient material with deflectable projections at the waves squeezably insertable and self-retained within a space between the window periphery and the body flange and thereafter receptive to accept and retain a molding flange with a reverse bent edge while then being retained between the window periphery and the molding flange.

3 Claims, 6 Drawing Figures

U.S. Patent    Dec. 25, 1979    4,179,859
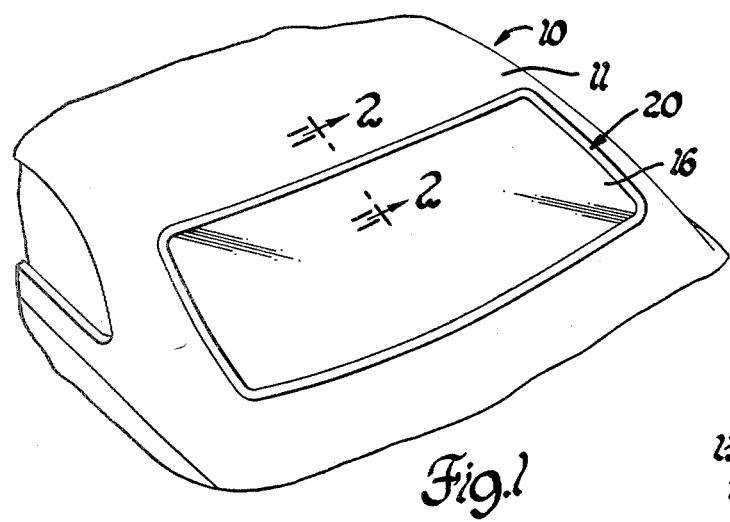
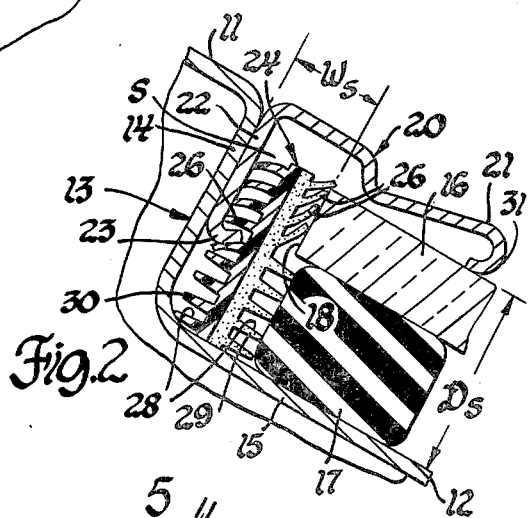
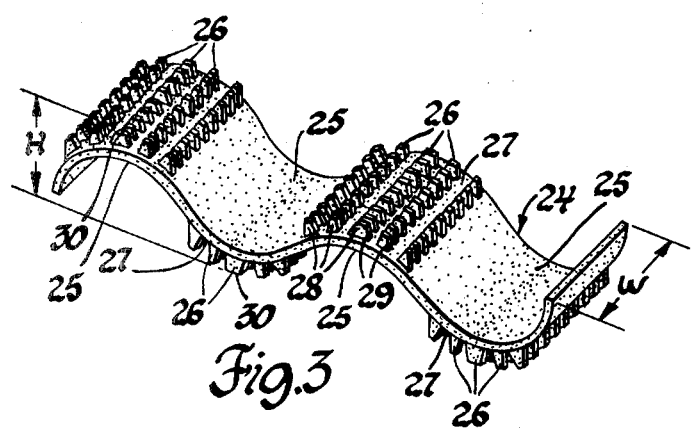
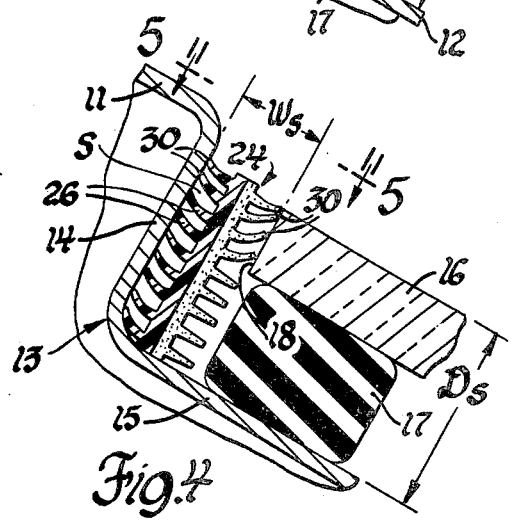
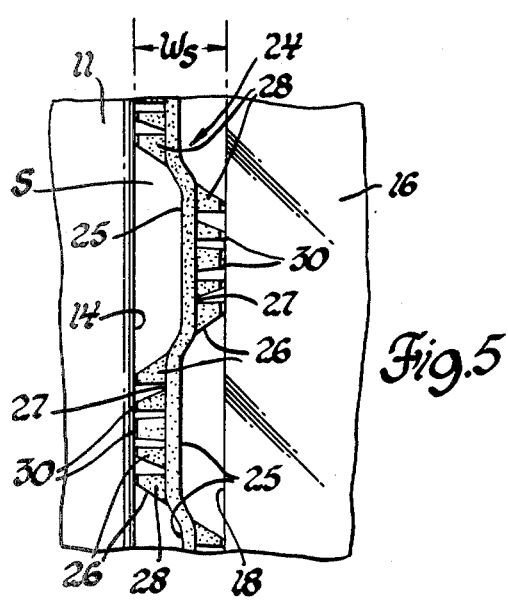
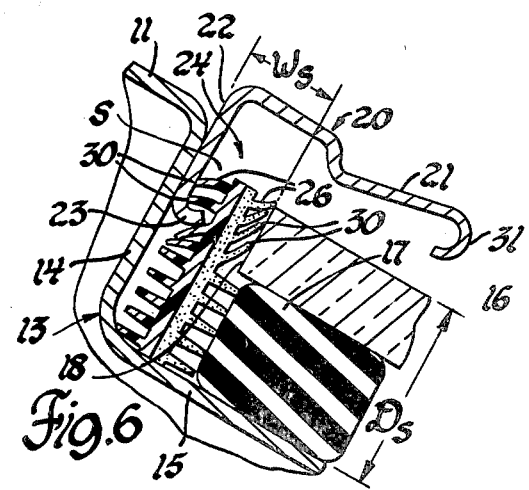

MOLDING RETAINING CLIP

This invention relates to a molding retaining clip and more particularly to a clip for retaining a molding to an imperforate body flange of a vehicle body or similar device.

Conventionally, moldings such as window reveal moldings, have been fastened to a vehicle body either by retainers having a fastening device that requires a perforation in the body flange which supports the window and defines the window opening or by retainers which must be bonded to the body flange. While these types of retainers have generally proven satisfactory, it remains desirable to avoid requiring perforations in the body flange and still not require the considerable time consuming step of bonding the retainer in place.

The molding retaining clip according to the present invention advances the art by being adapted to be inserted and self-retained in an accommodating space in the vehicle body arrangement. In the case of retaining a reveal molding about a window, the clip is inserted and self-retained in the space between the window periphery and the vehicle body flange which supports the window and defines the window opening. The clip comprises a waved strip of resilient material with deflectable projections which are spaced along and across the waves on both sides of the strip. The waved strip measuring between the ends of the projections on the opposite sides thereof has a normal maximum height greater than the width of the accommodating space by a predetermined amount so as to be squeezably insertable lengthwise into the space by flattening of the waves and with little or no deflection of the projections. The strip is then retained in the space by the stressed waves urging the ends of the projections on one strip side to grip the window periphery and the ends of the projections on the other strip side to grip the vehicle body flange. With the clip thus simply mounted in place, a molding flange with a reverse bent edge, can be forcibly inserted between the wave strip and the body flange with the projections on the body flange side after deflecting then assuming end gripping engagement with the molding flange and providing a barrier to retraction of the reverse bent edge while the projections on the other strip side engaging the window periphery are deflected to further enforce retention of the strip and thus of the reveal molding.

An object of the present invention is to provide a new and improved molding retaining clip.

Another object is to provide a molding retaining clip adapted to be inserted and self-retained within a confined space and thereafter being adapted to hold and retain a flange of a molding.

Another object is to provide a molding retaining clip in the form of a waved strip of resilient material having projections on the opposite strip sides extending from the waves wherein the strip is squeezably insertable lengthwise into a confined space and is self-retained and then adaptive to hold and retain a retention flange of a molding.

Another object is to provide a molding retaining clip adapted to be inserted and self-retained within a space between a periphery of a window and an imperforate vehicle body flange supporting the window and defining the window opening and thereafter being adaptive to hold and retain a molding flange insertable between the clip and body flange.

For a better understanding of the invention, as well as other objects and further features thereof, reference is had to the following detailed description of the invention, to be read in connection with the accompanying drawing, wherein:

FIG. 1 is a partial rear perspective view of a vehicle body with a rear window having a reveal molding secured thereabout by molding retaining clips according to the present invention;

FIG. 2 is an enlarged sectional view taken along the line 2—2 of FIG. 1 at one of the molding retaining clip locations;

FIG. 3 is a perspective view of the molding retaining clip in FIG. 2 prior to installation;

FIG. 4 is a view similar to FIG. 2 with the molding retaining clip installed but prior to insertion of the reveal molding;

FIG. 5 is a view taken along the line 5—5 in FIG. 4;

FIG. 6 is a view similar to FIG. 4 but showing the reveal molding being installed.

Referring to FIGS. 1 and 2, there is shown a vehicle body generally designated as 10 having an outer body panel 11 with a rear window opening 12 defined by an imperforate body flange 13 having a transverse portion 14 extending transverse to the plane of the opening and a terminal lateral portion 15 extending parallel to the plane of the opening. A window 16 is received by the flange and is sealingly secured in place to the lateral body flange portion 15 by a continuous bead of adhesive 17 at the interior side of the window adjacent the window periphery 18. The exterior of the window is slightly recessed from the outer body panel and there is provided a peripheral space S of predetermined width between the window periphery 18 and the transverse body flange portion 14. A reveal molding 20 has a decorative exposed portion 21 for covering the exterior peripheral edge of the window and also the space S between the window and the body flange. The reveal modling 20 has a flange 22 with a reverse bent edge 23 which is forcibly insertable between a plurality of molding retaining clips 24 and the transverse body flange portion 14 and is retained by these clips in the position shown as will now be described in detail.

The molding retaining clips 24 are adapted to be inserted and self-retained at peripherally spaced locations within the space S between the window and imperforate vehicle body flange. As best shown in FIG. 3, each of the clips 24 comprises an injection molded waved strip formed of resilient semi-rigid material such as nylon. The strip 24 has a sinusoidal or serpentine shape having a plurality of waves 25, in this case four, equally spaced along its length and extending across its width. A plurality of flexible projections or fingers 26 are formed integrally with the waved strip on opposite sides thereof and project from the concave side 27 and are spaced in rows along the length and breadth of each of the waves 25. The projections 26 are tapered, i.e. have draft angles, to facilitate their removal from a mold and have a rectangular cross-section with their flat sides 28 extending parallel to the length of the strip and their relatively narrow edges 29 extending widthwise of the strip. The width W of the strip is substantially equal to the depth Ds of the space S measured from the exterior side of the window and the strip has a normal maximum height H measuring between the ends 30 of the furthest extending projections on the opposite strip sides which is greater than the width Ws of the accommodating space by a predetermined amount so as to be squeezably insertable lengthwise fully into the space S as shown in FIGS. 4 and 5 by flattening of the waves and with little or no deflection of the projections. With the strip 24 thus inserted, it is retained in place by the thus stressed waves 25 urging the ends 30 of the projections on one strip side to grip the window periphery 18 and the ends 30 of the projections on the opposite strip side to grip the transverse portion 14 of the vehicle body flange.

With a plurality of the strips 24 thus inserted and self-retained within the space about the window periphery, the reveal molding 20 is mounted as shown in FIG. 6 by simply forcing its flange 22 between the strips and the transverse body flange portion 14. This insertion is permitted by the projections 26 on the body flange side deflecting to permit passage of the reverse bent edge 23 whereafter they then assume engagement at their ends 30 with the molding flange portion 22 thereby causing further squeezing of the strip as a result of the thickness of this flange. Insertion of the reveal molding is completed when the beaded end 31 of the molding engages the exterior side of the window. In this position the reverse bent edge 23 of the molding flange will be positioned between two rows of the projections 26 on the body flange side of the strip. The immediately outboard row of projections then present a barrier to retraction of the reverse bent edge while the projections on the other strip side engaging the window periphery are thereby additionally loaded by the molding installation to further enforce retention of the strip and thereby secure retention of the reveal molding in place.

It will also be understood that instead of using a plurality of the strips to secure the molding in place, the molding retaining clip of the invention can also be made as a single continuous clip or strip of a length corresponding to the length of the molding to be retained. Furthermore, it is not necessary that there be projections on every wave nor along the complete length and width thereof since this will be determined, for example, by the relative arrangement of parts and the magnitude of gripping force required in the particular application. In addition, where a plurality of separate clips are used, they may have as little as two waves with projections and still perform as described and, of course, they may have more than the four shown as mainly determined by the gripping or retention force required.

The above described embodiments are illustrative of the invention which may be modified within the scope of the appended claims.

What is claimed is:

1. A molding retaining clip adapted to be inserted and self-retained within a space between a periphery of a window and an imperforate vehicle body flange supporting the window and defining the window opening, said molding clip comprising a waved strip formed of resilient material having a plurality of waves spaced along its length and extending across its width, a plurality of integral projections on opposite sides of said waved strip projecting from the concave side of each of said waves, said waved strip being squeezably insertable lengthwise into the space and then retained therein by the waves urging the ends of the projections on one strip side to grip the window periphery and the ends of the projections on the other strip side to grip the vehicle body flange and whereafter upon forceable insertion of a molding flange with a reverse bent end between said strip and the body flange opening, the projections on said other strip side after deflecting to permit the molding flange insertion then assume end gripping engagement with the molding flange and also provide a barrier to retraction of the reverse bent end while the projections on said one strip side retain their engagement with the window periphery.

2. A molding retaining clip adapted to be inserted and self-retained within a space between a periphery of a window and an imperforate vehicle body flange supporting the window and defining the window opening, said molding clip comprising a waved strip formed of resilient material having a plurality of waves spaced along its length and extending across its width, a plurality of integral projections on opposite sides of said waved strip projecting from the concave side and spaced along the length and breadth of each of said waves, said waved strip measuring between the ends of the projections on the opposite strip sides having a normal maximum height greater than the width of the accommodating space by a predetermined amount so as to be squeezably insertable lengthwise into the space by flattening of said waves and with or without deflection of said projections whereby said waved strip is then retained in said space by the stressed waves urging the ends of the projections on one strip side to grip the window periphery and the ends of the projections on the other strip side to grip the vehicle body flange and whereafter upon forceable insertion of a molding flange with a reverse bent end between said strip and the body flange opening, the projections on said other strip side after deflecting to permit the molding flange insertion then assume end gripping engagement with the molding flange and also provide a barrier to retraction of the reverse bent end while the projections on said one strip side engaging the window periphery are urged to further enforce retention of said waved strip.

3. In combination with a vehicle body having a window opening defined by an imperforate body flange having a transverse portion extending transverse to the plane of the opening and a terminal lateral portion extending parallel to the plane of the opening, a window sealingly secured adjacent the edge thereof to said lateral body flange portion leaving a space between the window edge and said transverse body flange portion, a reveal molding for covering said window edge and said space, and reveal molding retainer means for retaining said reveal molding in place comprising a strip of resilient material having waves along its length and a plurality of flexible projections projecting from the crests of said waves on both sides of said strip, said waves and said projections having a combined free form height substantially greater than the width of said space and being squeezable by flattening of said waves to fit in said space whereafter said waves in such compressed state provide an expansive force causing said projections to frictionally retain engagement with the window edge and said transverse body flange portion and thereby retain said strip in said space, said reveal molding having a retention flange comprising a base portion extending parallel to said transverse body flange portion and a terminal reverse bend portion extending transverse to and away from said transverse body flange portion, said retention flange being forceably insertable between the flexible projections on one side of said strip and said transverse body flange portion to engage said terminal reverse bend portion on opposite sides thereof with adjacent flexible projections on said one side of said strip to thereby positively retain said reveal molding.

* * * * *

UNITED STATES PATENT AND TRADEMARK OFFICE
CERTIFICATE OF CORRECTION

PATENT NO. : 4,179,859
DATED : December 25, 1979
INVENTOR(S) : John J. Fricko et al.

It is certified that error appears in the above—identified patent and that said Letters Patent is hereby corrected as shown below:

Column 2, line 39, "modling" should read -- molding --.

Column 4, line 27, "forceable" should read -- forcible --.

Column 4, line 62, "forceably" should read -- forcibly --.

Signed and Sealed this

Thirteenth Day of May 1980

[SEAL]

Attest:

SIDNEY A. DIAMOND

Attesting Officer     Commissioner of Patents and Trademarks